United States Patent
Huang

(10) Patent No.: US 8,490,930 B2
(45) Date of Patent: Jul. 23, 2013

(54) TELESCOPIC SUPPORTIVE APPARATUS

(76) Inventor: Han-Ching Huang, Taichung (TW)

( * ) Notice: Subject to any disclaimer, the term of this patent is extended or adjusted under 35 U.S.C. 154(b) by 0 days.

(21) Appl. No.: 12/938,308

(22) Filed: Nov. 2, 2010

(65) Prior Publication Data

US 2012/0104192 A1 May 3, 2012

(51) Int. Cl.
*A47F 5/00* (2006.01)
(52) U.S. Cl.
USPC ............... 248/125.2; 248/122.1; 248/125.8; 248/354.6; 410/143; 410/151
(58) Field of Classification Search
USPC .......... 248/125.2, 125.3, 122.1, 125.1, 125.8, 248/354.6, 354.7
See application file for complete search history.

(56) References Cited

U.S. PATENT DOCUMENTS

| | | | | |
|---|---|---|---|---|
| 5,094,576 A | * | 3/1992 | Fredelius | 410/151 |
| 5,282,706 A | * | 2/1994 | Anthony et al. | 410/100 |
| 5,833,414 A | * | 11/1998 | Feldman et al. | 410/151 |
| 5,890,856 A | * | 4/1999 | Huang | 410/151 |
| 5,947,666 A | * | 9/1999 | Huang | 410/151 |
| 5,988,963 A | * | 11/1999 | Shiau | 410/151 |
| 6,062,782 A | * | 5/2000 | Huang | 410/151 |
| 6,247,882 B1 | * | 6/2001 | Huang | 410/151 |
| 6,698,984 B1 | * | 3/2004 | Chen | 410/151 |
| 6,837,642 B1 | * | 1/2005 | Lin | 403/109.1 |
| 7,331,567 B2 | * | 2/2008 | Li | 254/95 |
| 7,758,023 B2 | * | 7/2010 | Chang | 254/218 |
| 8,002,242 B2 | * | 8/2011 | Lu | 254/108 |
| 8,118,525 B2 | * | 2/2012 | Long et al. | 410/151 |
| 2008/0210915 A1 | * | 9/2008 | Ruan | 254/95 |

\* cited by examiner

*Primary Examiner* — Terrell McKinnon
*Assistant Examiner* — Monica Millner

(57) ABSTRACT

A telescopic supportive apparatus includes an external tube, an internal tube, a mount, a toothed wheel, a handle, a first detent and a second detent. The internal tube is telescopically inserted in the external tube and formed with a series of recesses. The mount is secured to the external tube. The toothed wheel is supported on the mount and formed with teeth for insertion in the recesses. The handle is supported on the mount. The first detent is movably located on the mount and formed with a ratchet for engagement with the teeth. The second detent is movably located on the mount and formed with a ratchet for engagement with the teeth. The damping unit is located on the mount for damping the spinning of the toothed wheel and therefore the insertion of the internal tube into the external tube.

3 Claims, 6 Drawing Sheets

TELESCOPIC SUPPORTIVE APPARATUS

BACKGROUND OF INVENTION

1. Field of Invention

The present invention relates to transportation of cargo and, more particularly, to a telescopic supportive apparatus for supporting and therefore positioning cargo in a truck.

2. Related Prior Art

Cargo is transported to buyers from sellers through various vehicles such as airplanes, ships, trains, and trucks. Trucks are the most often used vehicles among them. Cargo is located in a container of a truck. Various items of the cargo are stacked. The items however rattle inevitably during the transportation. Some of the items on the top might fall from the others on the bottom and get damaged.

To support and position cargo in a container, the present inventor has devised telescopic supportive apparatuses claimed in Taiwanese Patent Publication Nos. 241668 and 371434. Such a telescopic supportive apparatus includes an internal tube, an external tube, a mount, a toothed or ratcheted wheel, a handle and two spring-biased detents. The internal tube is telescopically inserted in the external tube. The mount is secured to the external tube. The toothed or ratcheted wheel and the handle are located on the mount. The first spring-biased detent is movably located on the mount while the second spring-biased detent is movably located on the handle. In use, the handle is pivoted in a direction, and the first spring-biased detent rattles and moves on the toothed or ratcheted wheel while the second spring-biased detent engages with the toothed or ratcheted wheel. Thus, the second spring-biased detent spins the toothed or ratcheted wheel which extends the internal tube from the external tube. Then, the handle is pivoted in an opposite direction, and the first spring-biased detent engages with and stops the toothed or ratcheted wheel while the second spring-biased detent rattles and moves on the toothed or ratcheted wheel. The toothed or ratcheted wheel positions the internal tube relative to the external tube. By pivoting the handle to and fro, the internal tube is extended from the external tube little by little. Both the spring-biased detents can be disengaged from the toothed or ratcheted wheel to allow free insertion of the internal tube into the external tube.

The telescopic supportive apparatuses can be used as a crossbar or a post. When it is used as a post, the internal tube might drop into the external tube rapidly because of the gravity. The rapidly dropping internal tube might hurt a user.

The present invention is therefore intended to obviate or at least alleviate the problems encountered in prior art.

SUMMARY OF INVENTION

It is the primary objective of the present invention to provide a safe telescopic supportive apparatus.

To achieve the foregoing objective, the telescopic supportive apparatus includes an external tube, an internal tube, a mount, a toothed wheel, a handle, a first detent and a second detent. The internal tube is telescopically inserted in the external tube and formed with a series of recesses. The mount is secured to the external tube. The toothed wheel is supported on the mount and formed with teeth for insertion in the recesses. The handle is supported on the mount. The first detent is movably located on the mount and formed with a ratchet for engagement with the teeth. The second detent is movably located on the mount and formed with a ratchet for engagement with the teeth. The damping unit is located on the mount for damping the spinning of the toothed wheel and therefore the insertion of the internal tube into the external tube.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
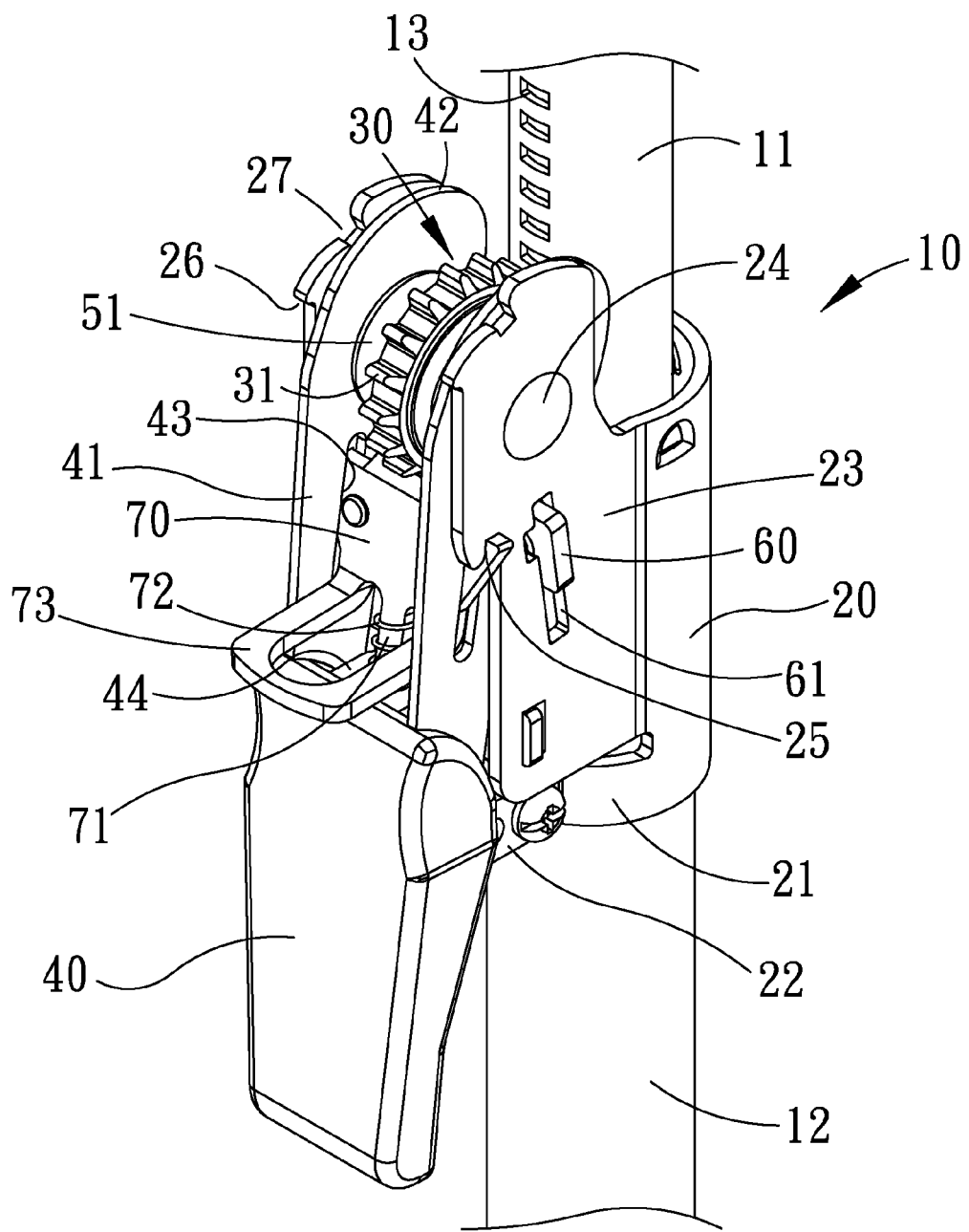
FIG. 1 is a perspective view of a telescopic supportive apparatus according to the preferred embodiment of the present invention.
Figure 2:
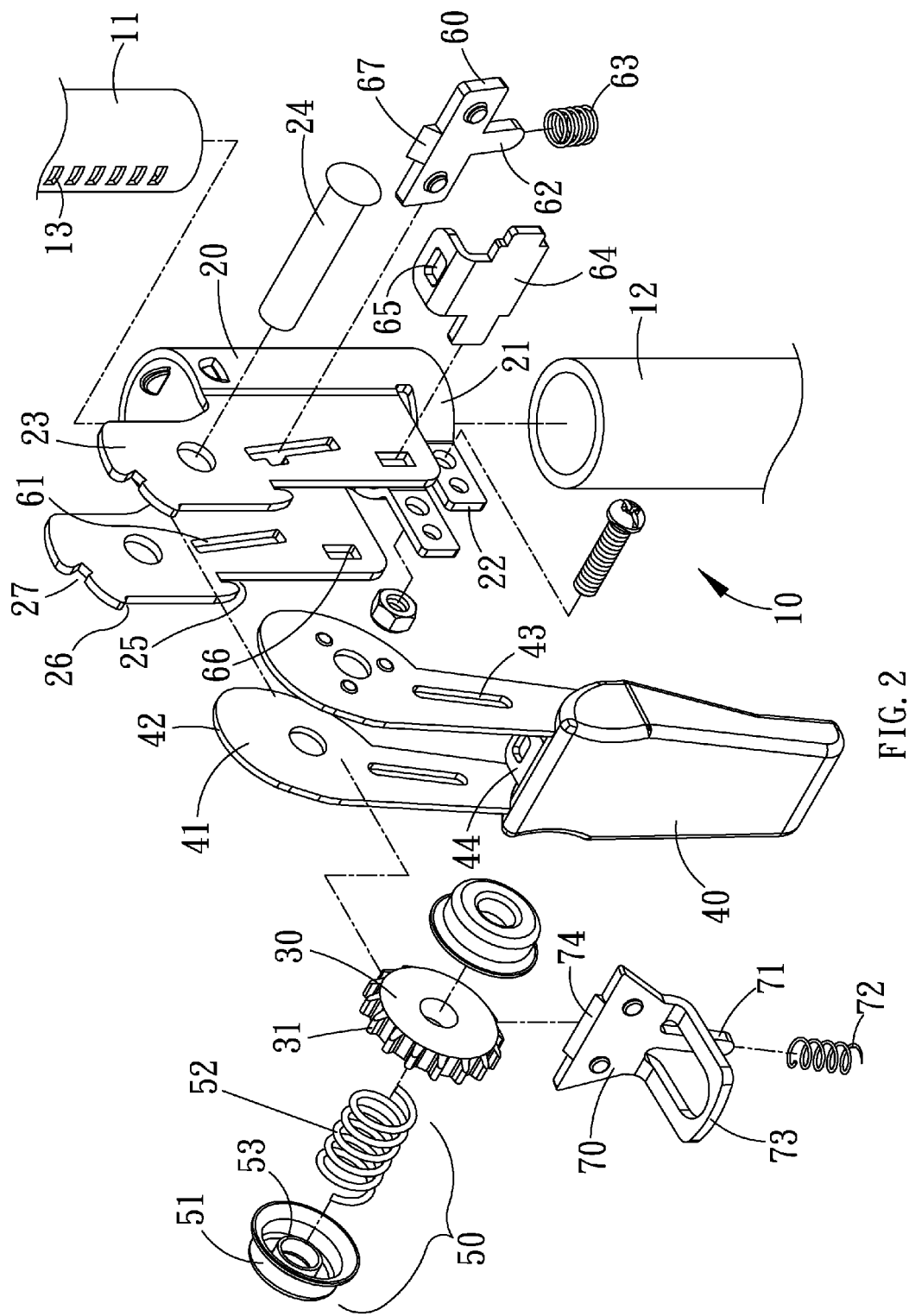
FIG. 2 is an exploded view of the telescopic supportive apparatus shown in FIG. 1.

Referring to FIGS. 1 and 2, a telescopic supportive apparatus 10 includes an internal tube 11, an external tube 12, a mount 20, a toothed wheel 30, a handle 40, a damping unit 50 and two spring-biased detents 60 and 70 according to the preferred embodiment. The internal tube 11 includes a series of recesses 13 defined therein. The recesses 13 are apertures or cavities.

The mount 20 extends for more than 180° about an axis. The mount 20 includes two strips 21, two lugs 22 and two plates 23. Each of the strips 21 extends from an edge of the mount 20. Each of the lugs 22 extends from a related one of the strip 21. Each of the plates 23 extend from a related one of the edges of the mount 20. Each of plates 23 includes a stop 26 formed thereon between two locking portions 25 and 27, a slot 61 defined therein, and an aperture 66 defined therein.

The wheeled wheel 30 is formed with teeth 31. The teeth 31 are made corresponding to the recesses 13.

The handle 40 includes two shanks 41, two cams 42, and a tab 44. Each of the shanks 41 includes a slot 43 defined therein. An end of each of the shanks 41 is inserted in a grip. Each of the cams 42 is formed at an opposite end of a related one of the shanks 41. Between the shanks 41 is formed the tab 44.

The damping unit 50 includes a cap 51 and a spring 52. The cap 51 includes an annular groove 53 defined between two annular portions.

The first detent 60 includes a ratchet 67 extending from an edge and an insert 62 extending from an opposite edge. The ratchet 67 is made corresponding to the teeth 31.

There is provided an abutment element 64. The abutment element 64 includes an aperture 65 defined therein.

The second detent 70 includes a ratchet 74 extending from an edge and an insert 71 extending from an opposite edge. The ratchet 74 is made corresponding to the teeth 31. The second detent 70 further includes a lug 73 extending in perpendicular to the insert 71.

Referring to FIGS. 3 to 6, in assembly, the internal tube 11 is telescopically inserted in the external tube 12. The mount 20 is located around the external tube 12. At least one screw is inserted through the ears 22 and engaged with a nut. Thus, the mount 20 is secured to the external tube 12.

A rivet 24 is inserted through the plates 23, the cams 42 and the toothed wheel 30. Thus, the toothed wheel 30 and the handle 40 are connected to the mount 20. Some of the teeth 31 are inserted in some of the recesses 13.

An end of a spring 52 is inserted in the annular groove 53 while an opposite end of the spring 52 is located against the toothed wheel 30. The spring 52 is compressed between the cap 51 and the toothed wheel 30. The cap 51 is located against a related one of the cams 42. The damping unit 50 is located between the related cam 42 and the toothed wheel 30.

Two ends of the abutment element 64 are located in the apertures 66 so that the abutment element 64 is secured to the mount 20. Two ends of the first detent 60 are movably located in the slots 61 so that the first detent 60 is movably located on the mount 20. The insert 62 is inserted through a spring 63 before it is inserted through the aperture 65. The spring 63 is compressed between the first detent 60 and the abutment element 64.

Two ends of the second detent 70 are movably located in the slots 43 so that the second detent 70 is movably located on the handle 40. The insert 71 is inserted through a spring 72 before it is inserted through an aperture defined in the tab 44. The spring 72 is compressed between the second detent 70 and the tab 44.

Figure 3:
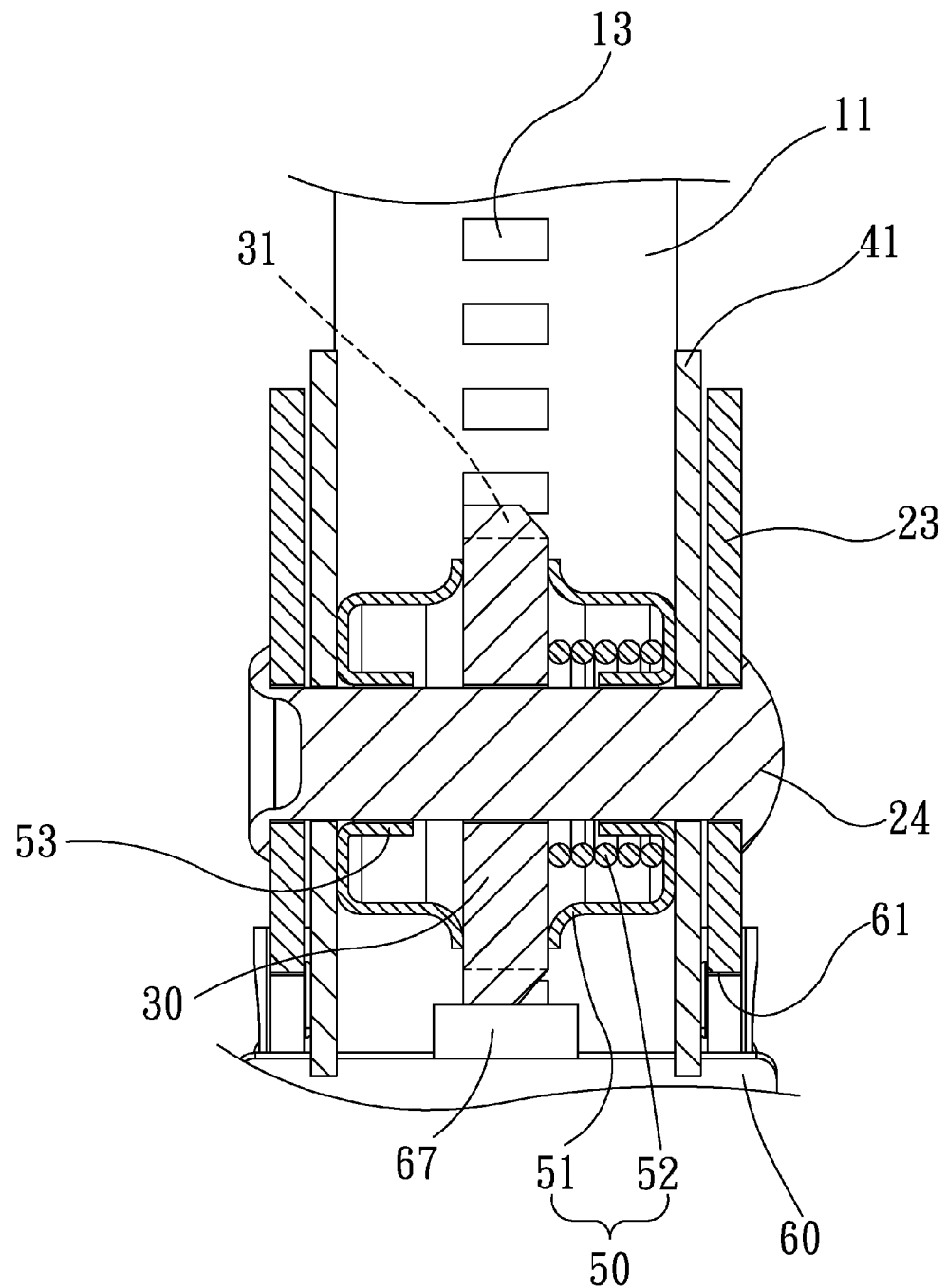
FIG. 3 is a cross-sectional view of the telescopic supportive apparatus shown in FIG. 1.
Figure 4:
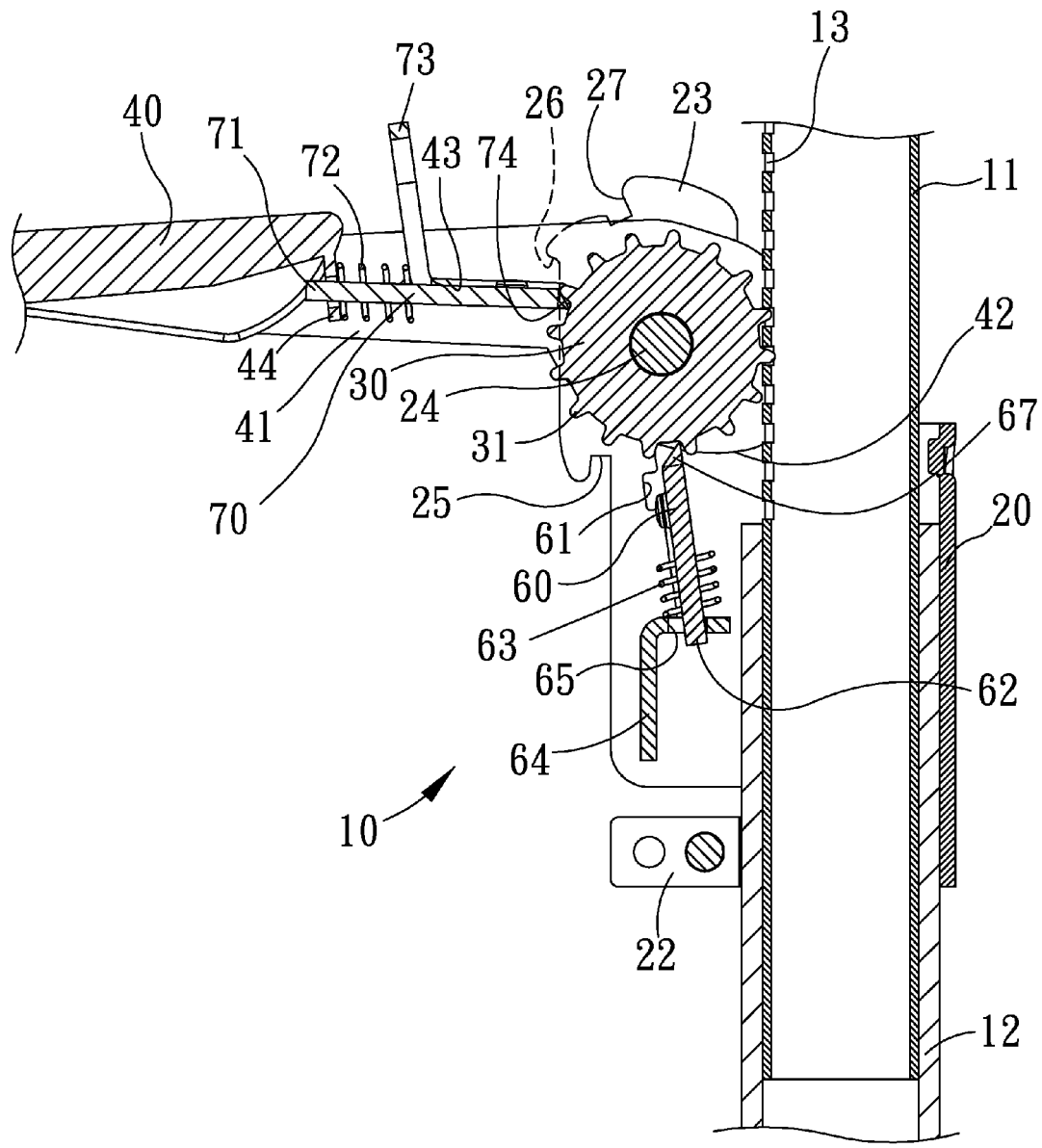
FIG. 4 is a cross-sectional view of the telescopic supportive apparatus in another position than shown in FIG. 3.
Figure 5:
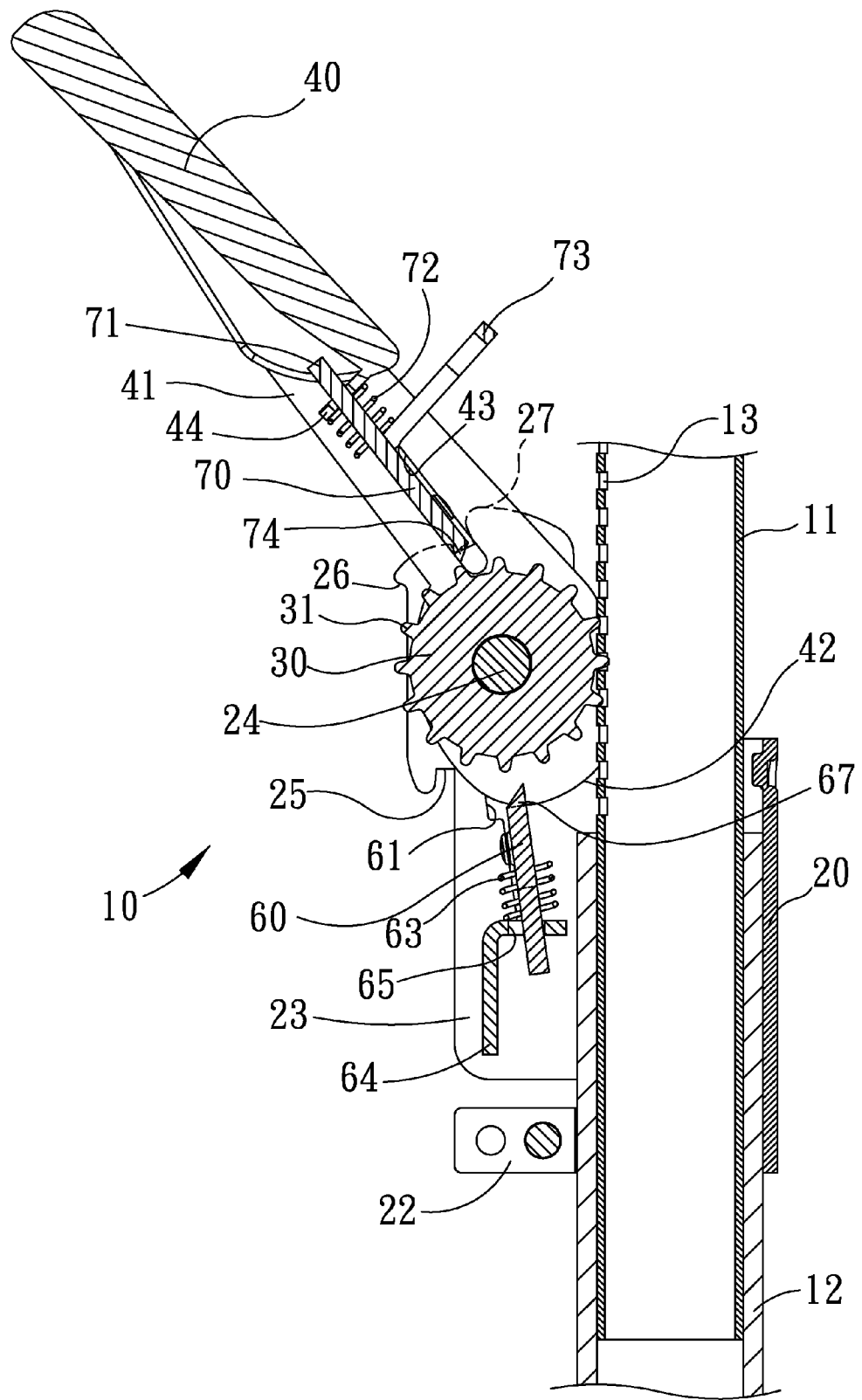
FIG. 5 is a cross-sectional view of the telescopic supportive apparatus in another position than shown in FIG. 4.
Figure 6:
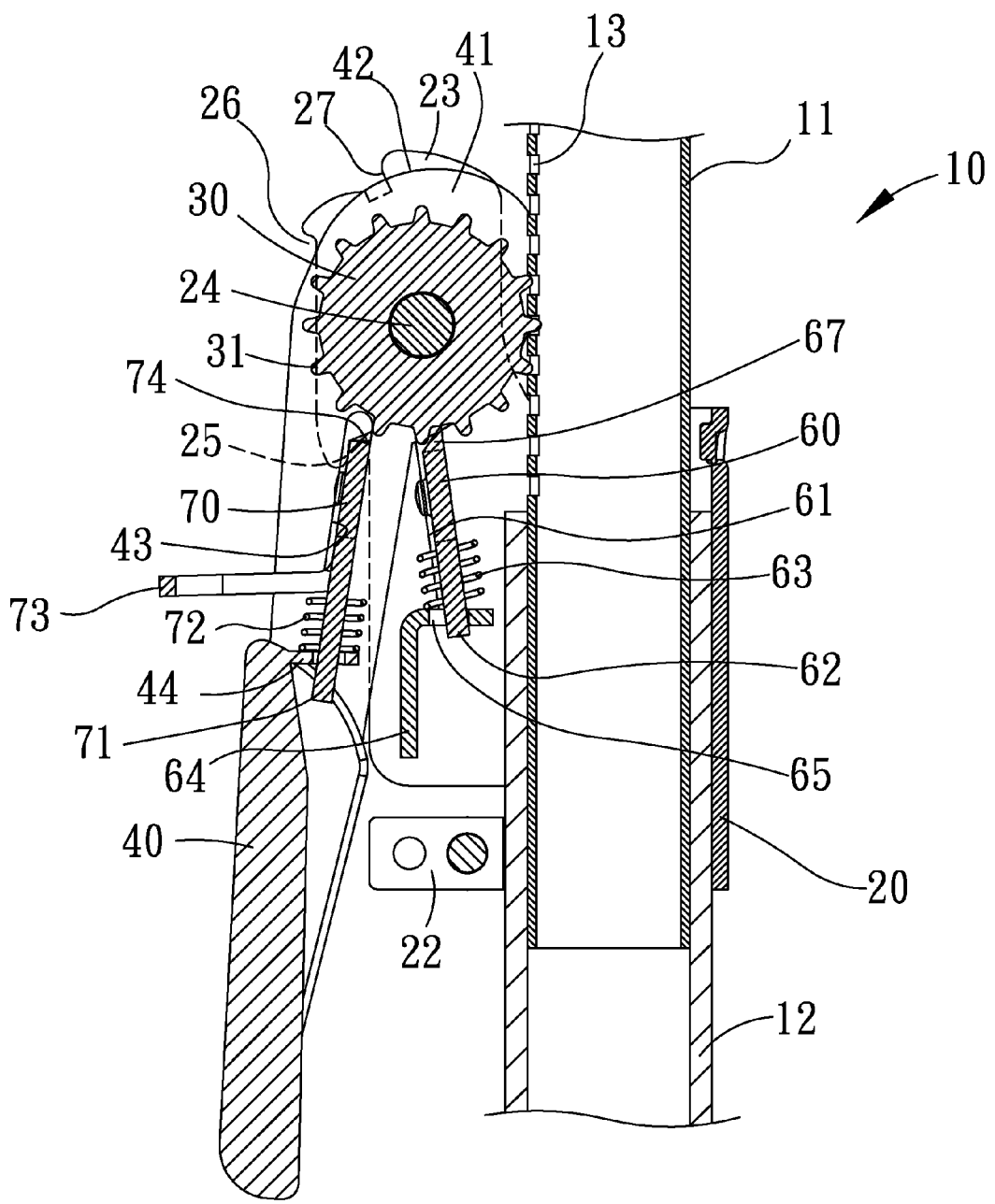
FIG. 6 is another cross-sectional view of the telescopic supportive apparatus shown in FIG. 5.

Referring to FIG. 3, in use, the handle 40 is pivoted in a direction, and the ratchet 67 of the first detent 60 engages with one of the teeth 31 of the toothed wheel 30 while the ratchet 74 of the second detent 70 rattles and moves on the toothed wheel 30. Thus, the first detent 60 stops the toothed wheel 30. The toothed wheel 30 positions the internal tube 11 relative to the external tube 12. The pivotal of the handle 40 is limited by the stops 26.

Then, the handle 40 is pivoted in an opposite direction, and the ratchet 67 of the first detent rattles 60 rattles and moves on the toothed wheel 30 while the ratchet 74 of the second detent 70 engages with the toothed wheel 30. Therefore, the second detent 70 spins the toothed wheel 30. The toothed wheel 30 extends the internal tube 11 from the external tube 12. With the steps repeated, the internal tube 11 is extended from the external tube 12 little by little.

The ends of the second detent 70 can be located in the first locking portions 25 of the plates 23 thus preventing the pivotal of the handle 40. Now, the spinning of the toothed wheel 30 is avoided by at least the first detent 60. Hence, the internal tube 11 is positioned relative to the external tube 12.

The ends of the second detent 70 can be located in the second locking portions 27 of the plates 23 thus preventing the pivotal of the handle 40 and disengaging both of the detents 60 and 70 from the toothed wheel 30. Hence, spinning of the toothed wheel 30 is allowed, and so is the insertion of the internal tube 11 into the external tube 12. The spinning of the toothed wheel 30 is damped by the damping unit 50, and so is the insertion of the internal tube 11 into the external tube 12. Hence, rapid free dropping of the internal tube 11 into the external tube 12 is avoided when the telescopic supportive apparatus 10 is used as a post.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A telescopic supportive apparatus including:
    an external tube;
    an internal tube telescopically inserted in the external tube and formed with a series of recesses;
    a mount secured to the external tube;
    a toothed wheel supported on the mount and formed with teeth for insertion in the recesses;
    a handle supported on the mount;
    a first detent movably located on the mount and formed with a ratchet for engagement with the teeth;
    a second detent movably located on the mount and formed with a ratchet for engagement with the teeth; and
    a damping unit including a spring compressed between a side of the toothed wheel and a side of the handle to exert friction between the toothed wheel and the handle and a cap formed with a side in contact with the spring and an opposite side placed against one of the toothed wheel and the handle, thus damping the rotation of the toothed wheel relative to the handle and hence insertion of the internal tube into the external tube.

2. The telescopic supportive apparatus according to claim 1, wherein the mount includes two plates, wherein the toothed wheel is located between and supported on the plates.

3. The telescopic supportive apparatus according to claim 1, wherein the cap includes an annular groove defined therein, wherein an end of the spring is located in the annular groove.

* * * * *